(12) United States Patent
Dondeti

(10) Patent No.: US 9,071,588 B2
(45) Date of Patent: *Jun. 30, 2015

(54) SECURE GROUP COMMUNICATIONS

(71) Applicant: RPX Clearinghouse LLC, San Francisco, CA (US)

(72) Inventor: Lakshminath Dondeti, Chelmsford, MA (US)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/645,137

(22) Filed: Oct. 4, 2012

(65) Prior Publication Data

US 2013/0247158 A1 Sep. 19, 2013

Related U.S. Application Data

(63) Continuation of application No. 12/804,216, filed on Jul. 15, 2010, now Pat. No. 8,300,830.

(51) Int. Cl.
*H04L 29/06* (2006.01)
*H04L 9/08* (2006.01)

(52) U.S. Cl.
CPC ............ *H04L 63/062* (2013.01); *H04L 9/0833* (2013.01); *H04L 2209/38* (2013.01)

(58) Field of Classification Search
CPC ...................................................... H04L 29/06
See application file for complete search history.

(56) References Cited

U.S. PATENT DOCUMENTS

| 5,748,736 | A | 5/1998 | Mittra |
| 6,263,435 | B1 | 7/2001 | Dondeti et al. |
| 6,389,635 | B1 | 5/2002 | Petner et al. |
| 6,594,758 | B1 | 7/2003 | Okui |
| 6,757,825 | B1 | 6/2004 | MacKenzie et al. |
| 6,820,204 | B1 | 11/2004 | Desai et al. |

(Continued)

OTHER PUBLICATIONS

Lamport, L., "Password Authentication with Insecure Communications", Communications of the AMC, 24 (11): 770-772, Nov. 1981.

(Continued)

*Primary Examiner* — Pramila Parthasarathy
(74) *Attorney, Agent, or Firm* — Mintz Levin Cohn Ferris Glovsky and Popeo, P.C.

(57) ABSTRACT

A device for use in a system with multiple receiving units, and multiple intermediate units each configured to communicate with the device and at least some of the multiple receiving units, includes a communication module configured to send information toward and receive information from the receiving units and the intermediate units, a memory, and a processor coupled to the memory and the communication module. The processor is configured to: cause the communication module to send information toward each of the receiving units sufficient for the receiving units to obtain a key chain corresponding to that receiving unit, each key chain containing a plurality of keys, each key in each key chain being related to other keys in the respective key chains by at least one inverse of a one-way function; select a key from a key chain associated with a particular receiving unit and stored in the memory; and cause the communication module to send the selected key, and an indication of which receiving unit the selected key is associated with, toward the intermediate unit associated with the particular receiving unit.

21 Claims, 5 Drawing Sheets

(56) References Cited

U.S. PATENT DOCUMENTS

| | | | |
|---|---|---|---|
| 7,254,712 B2 | 8/2007 | Godfrey et al. | |
| 7,349,545 B2 | 3/2008 | Kim | |
| 7,599,497 B2 * | 10/2009 | Soppera | 380/279 |
| 7,783,043 B1 * | 8/2010 | Dondeti | 380/278 |
| 8,300,830 B2 * | 10/2012 | Dondeti | 380/278 |
| 2002/0083334 A1 | 6/2002 | Rogers et al. | |
| 2003/0126464 A1 | 7/2003 | McDaniel et al. | |
| 2003/0190042 A1 | 10/2003 | Tagashira et al. | |
| 2004/0250072 A1 | 12/2004 | Ylonen | |
| 2005/0058294 A1 | 3/2005 | Chen et al. | |
| 2005/0271210 A1 | 12/2005 | Soppera | |
| 2006/0187923 A1 | 8/2006 | Yu | |
| 2006/0282675 A1 | 12/2006 | Yao | |
| 2007/0014411 A1 | 1/2007 | Ghosh | |

OTHER PUBLICATIONS

Perig, et al., "Efficient Authentication and Signing of Multicast Streams over Lossy Channels", In Proceedings of the IEEE Symposium on Security and Privacy, Oakland, CA, May 2000.

Haller, N., "The S/KEY One-Time Password System", Proceedings of the ISOC Symposium on Network and Distributed System Security, Feb. 1994, San Diego, CA.

Banerjee, et al. "Scalable Secure Group Communication over IP Multicast", International Conference on Network Protocols (ICNP) 2001, Riverside, CA, Nov. 2001.

Mittra, S., "Iolus: A Framework for Scalable Secure Multicasting", Proceedings of ACM SIGCOMM '97 Cannes, France, pp. 277-288, 1997.

* cited by examiner

SECURE GROUP COMMUNICATIONS

CROSS-REFERENCE TO RELATED PATENT APPLICATIONS

The present application is a continuation of and claims priority to U.S. patent application Ser. No. 12/804,216, filed Jul. 15, 2010, (now U.S. Pat. No. 8,300,830, issued Oct. 30, 2012), the disclosures of which are fully incorporated herein by reference in their entireties for all purposes.

FIELD OF THE INVENTION

The invention relates to secure communications and more particularly to reduced-communication sharing of secure communication keys.

BACKGROUND OF THE INVENTION

In today's technology-driven society, it is often desirable to have secure communications among a large group of members. For such communications, the Internet Engineering Task Force (IETF) has defined three problem areas, namely source authentication, group key management, and group policy distribution. Group key management includes distribution of keys used to encrypt data/communications to enable secure communications while inhibiting undesired access to, and undesired ability to calculate, these keys. Referring to FIG. 1, scalability issues in group key distribution can be addressed in a system 10 using a centralized group manager (GM) 12 that manages the group of members 16 by proxy via subordinate subgroup managers (SGMs) 14.

The GM 12 delegates key management functions to designated SGMs 14. Each SGM 14 distributes keys to members (M) 16 within the SGM's subgroup. Two categories of SGMs are: (1) trusted third-party entities in an infrastructure containing group management entities (the GM 12 and the SGMs 14); and (2) members designated as SGMs. For members as SGMs, the SGM for any member may change during a lifetime of the group or subgroup. If so, the replacement of the SGM may involve very large computation as well as communication overhead. The SGM 14 and each of its members 16 establish a shared secret during initialization of the SGM 14 and when changing SGMs 14. Establishing the shared secret can be performed over a secure channel using asymmetric key operations, with one asymmetric key operation for each member 16 associated with the new SGM 14. Asymmetric key operations use significant computational power (e.g., approximately 1,000-10,000 times more computational power than symmetric operations).

SUMMARY OF THE INVENTION

In general, in an aspect, the invention provides a device for use in a system with multiple receiving units, and multiple intermediate units each configured to communicate with the device and at least some of the multiple receiving units. The device includes a communication module configured to send information toward and receive information from the receiving units and the intermediate units, a memory, and a processor coupled to the memory and the communication module. The processor is configured to: cause the communication module to send information toward each of the receiving units sufficient for the receiving units to obtain a key chain corresponding to that receiving unit, each key chain containing a plurality of keys, each key in each key chain being related to other keys in the respective key chains by at least one inverse of a one-way function; select a key from a key chain associated with a particular receiving unit and stored in the memory; and cause the communication module to send the selected key, and an indication of which receiving unit the selected key is associated with, toward the intermediate unit associated with the particular receiving unit.

Implementations of the invention may include one or more of the following features. The processor is further configured to, for each of the receiving units: repeatedly apply a first one-way function initially using a primary seed as an operand, and thereafter using a result of a previous application as an operand, to determine a plurality seeds; and calculate the key chain using a second one-way function with the corresponding plurality of seeds as operands. The information comprises the primary seed and a number indicative of a number of keys in the key chain. The processor is further configured to communicate with each receiving unit via the communication module to agree upon the number of keys in the key chain for each receiving unit.

Implementations of the invention may also include one or more of the following features. The processor is further configured to determine a change of intermediate unit associated with the particular receiving unit from a first intermediate unit to a second intermediate unit, wherein the processor is configured to cause the communication module to send another selected key toward the second intermediate unit in response to determining the change of intermediate unit. Each key chain associated with each receiving unit has a sequence of the keys in the key chain, and wherein the another selected key is a more-senior key in the sequence of keys in the associated key chain than the selected key. The another selected key is the next-most-senior key in the sequence of keys in the associated key chain relative to the selected key. The information is the key chain.

In general, in another aspect, the invention provides a computer program product stored on a computer-readable medium, for use with a computer configured to communicate with a subgroup management device and a group management device, the computer program product including computer-executable instructions for causing the computer to: store a key chain comprising a plurality of keys, it being computationally difficult to determine any key in the key chain from another key in the key chain; use a first key in the key chain in association with a first subgroup management device with which the computer is associated; detect a change in association between the computer and an associated subgroup management device from the first subgroup management device to a second subgroup management device; and select a second key in the key chain, different from the first key, for use in association with the second subgroup management device.

Implementations of the invention may include one or more of the following features. The computer program product further includes computer-executable instructions for causing the computer to: receive a primary seed from the group management device; compute a seed chain, comprising a plurality of seeds, using the primary seed and a first one-way function; and compute the key chain using the plurality of seeds and a second one-way function. The computer program product further includes computer-executable instructions for causing the computer to: establish a secure communication channel with the group management device; and agree to a number of keys to be computed from the primary seed. The computer-executable instructions for causing the computer to select the second key cause the computer to select as the second key a more-senior key than the first key. The computer-executable instructions for causing the computer to select the second key cause the computer to select as the second key a next-most-senior key in the key chain relative to the first key.

Implementations of the invention may also include one or more of the following features. The computer-executable instructions for causing the computer to use the first key cause the computer to securely communicate with the subgroup management device using symmetric key operations using the first key. The computer-executable instructions for causing the computer to use the first key cause the computer to verify authenticity of the subgroup management device with the first key. The computer program product further includes computer-executable instructions for causing the computer to use the second key to at least one of securely communicate with the second subgroup management device and authenticate the second subgroup management device.

In general, in another aspect, in a system for communicating data securely from a data source, through intermediaries, to receivers, or for which authentication of data sources is desired, the invention provides a method including providing information related to a key chain from the source to a desired receiver, storing the key chain such that the key chain is accessible by the source and by the desired receiver, providing a particular key, from the key chain, by the source to a desired intermediary associated with the desired receiver, and using the particular key by the desired intermediary and the desired receiver for at least one of authentication of the desired intermediary and secure symmetric-key-operation communication between the desired intermediary and the desired receiver.

Implementations of the invention may include one or more of the following features. Providing the information related to the key chain comprises providing a primary seed to the desired receiver, the method further including, at the desired receiver, computing a seed chain, containing a plurality of seeds, from the primary seed using a first one-way function, with an operand of the first one-way function being a previous output of the one-way function, and computing the key chain using the plurality of seeds as operands of a second one-way function. The method further includes, at the source, computing the seed chain from the primary seed using the first one-way function, with an operand of the first one-way function being the previous output of the one-way function, and computing the key chain using the plurality of seeds as operands of the second one-way function. The desired intermediary is a first intermediary, the method further including detecting, by the source and the desired receiver, a change in intermediaries associated with the desired receiver from a first intermediary to a second intermediary, providing a more-senior key than the particular key from the source to the second intermediary, and using the more-senior key by the second intermediary and the desired receiver for at least one of authentication of the second intermediary and secure symmetric-key-operation communication between the second intermediary and the desired receiver. The more-senior key is a next-most senior key in the key chain relative to the particular key.

Implementations of the invention may also include one or more of the following features. Storing the key chain comprises storing the key chain at the source and at the selected receiver. Providing the information related to the key chain comprises providing the key chain. The method further includes establishing a secure communication channel between the source and a desired receiver, agreeing between the source and the desired receiver as to a number of keys to compute for the key chain, and tearing the secure communication channel down after providing the information related to the key chain from the source to the desired receiver, and after agreeing as to the number of keys.

Various aspects of the invention may provide one or more of the following advantages. Asymmetric key operations can be avoided when a subgroup manager in a secure system is replaced or added, or system members otherwise become newly associated with a subgroup manager. Performance overhead can be avoided when members become associated with a new subgroup manager with which the members are to have secure communications. Efficient secret key downloads can be provided in a replicated server model. Efficient and secure key downloads can be provided in a hierarchical group key server model. Secure group communications can be provided with fewer operations performed than using current techniques. Performance overhead for secure group communications can be reduced. New subgroup managers to a secure communication system can be inhibited from determining prior security keys (i.e., backward secrecy may be provided). Departing subgroup managers of a secure communications system can be inhibited from determining future security keys (i.e., forward secrecy may be provided). Connection handoff between base stations in the presence of a home station can be done cheaper compared to current techniques.

These and other advantages of the invention, along with the invention itself, will be more fully understood after a review of the following figures, detailed description, and claims.

DETAILED DESCRIPTION OF PREFERRED EMBODIMENTS

Figure 1:
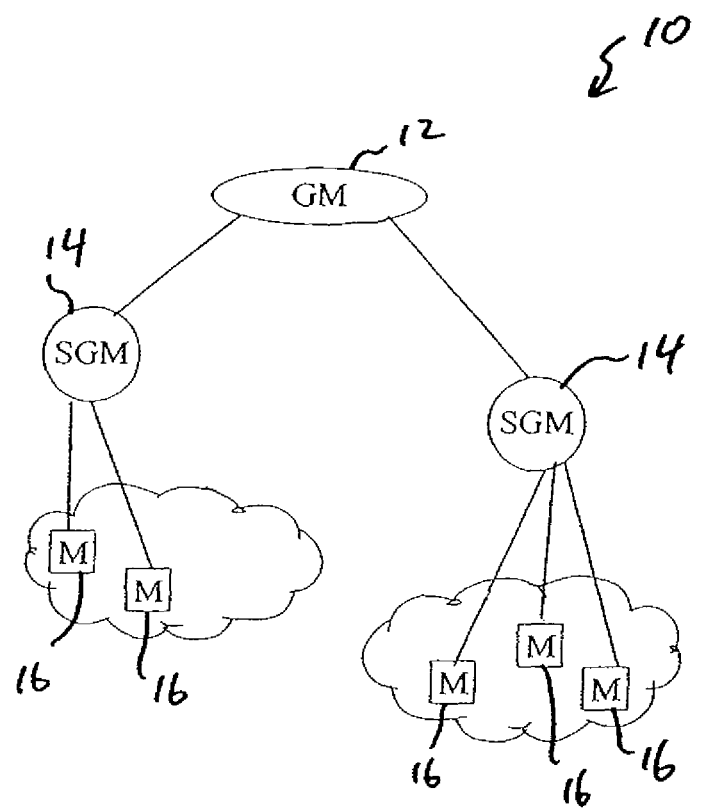
FIG. 1 is a simplified diagram of a group communications system.
Figure 2:
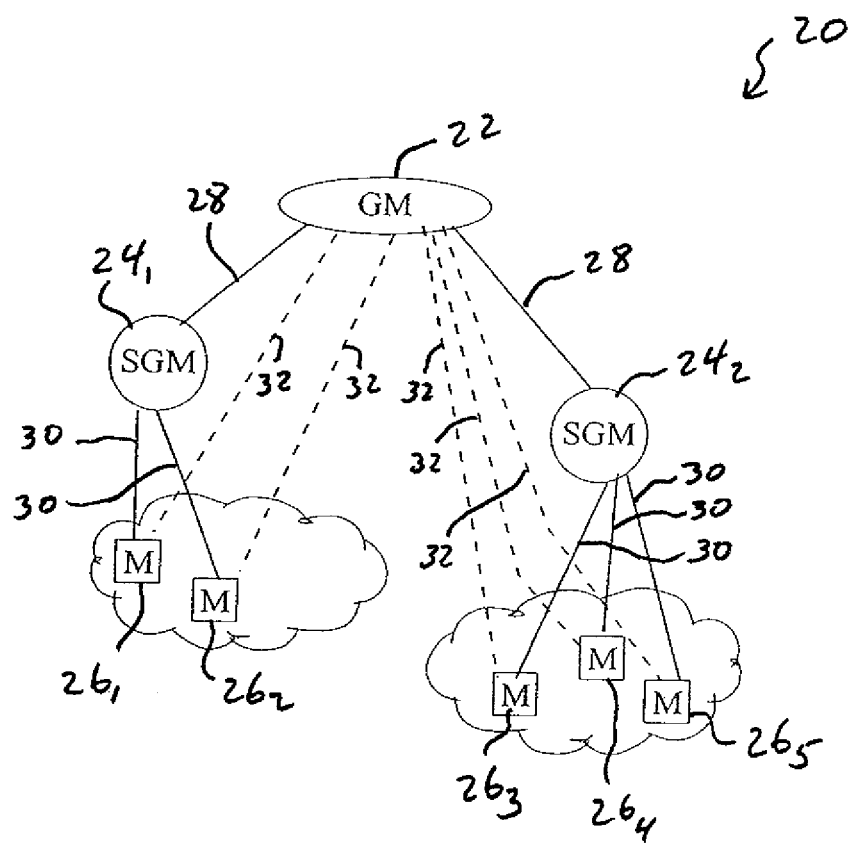
FIG. 2 is a simplified diagram of a group communications system employing seeded key chains.

Referring to FIG. 2, a secure group communications system 20 includes a group manager (GM) 22, subgroup managers (SGMs) 24, and members (M) 26. While only two SGMs 24 and five members 26 are shown, many more SGMs 24 and members 26 are possible. For example, one GM 22 may be associated with tens or hundreds of SGMs 24, and there may be millions of members 26 associated with the one GM 22. These quantities shown and mentioned are exemplary only, and other numbers of SGMs 24 and members 26 are acceptable and within the scope of the invention. The system 20 is configured to provide secure communications among the GM 22, the SGMs 24, and the members 26. The GM 22, SGMs 24, and members 26 may be implemented using computers that include processors and memory that store software code instructions for causing the processors to execute functions as described below.

The GM 22, the SGMs 24, and the members 26 can communicate over secure channels. These secure channels can be private lines, or public lines using asymmetric key operations (public/private key pairs) or symmetric key operations (a common key that has been securely agreed upon, e.g., using a private line or asymmetric key operations). Secure channels 28 between the GM 22 and the SGMs 24, and secure channels 30 between the SGMs 24 and the respective members 26, are permanent in that they are active for the life of the respective SGM 24. Secure channels 32 are temporary in that they are active only during initialization of key chains, as discussed below, of the members 26. Shared secrets of the secure channels 28, 30, are periodically updated to help prevent attacks on information conveyed in the system 20. Preferably, at least some updates are performed using asymmetric key operations.

The GM 22 is an apparatus with a high capacity for processing information and communicating with the SGMs 24 and the members 26. For example, the GM 22 may be a server coupled to the SGMs 24 via high-speed communication lines such as T1 lines, optical fibers, or other communication lines and/or networks. The GM 22 is configured to establish the relatively permanent secure communication channels 28 with the SGMs 24 (e.g., using IKE Phase1, SSL/TLS, or DH exchanges). The relatively permanent secure channels 28 to each of the SGMs 24 are maintained while each SGM 24 is part of the system 20.

The GM 22 is configured to establish the temporary secure channels 32 with the members 26, and to communicate with the members 26 to establish a key chain (a set of keys for encrypting information). Using techniques similar to those for establishing the channels 28, the GM 22 can establish the channels 32. The GM 22 can use the secure channels 32 to communicate a seed S (a value from which another seed and/or a key may be derived) to each of the members 26. Seeds are preferably different for each member 26 and can be produced by the GM 22 using, e.g., a random number generator. The GM 22 is further configured to communicate with each member 26 to agree upon a number of keys, r, that can be extracted or otherwise determined using the provided seed. The number of keys r may be different for each member 26, or at least some of the members 26 may have the same agreed-upon number of keys.

Figure 3:
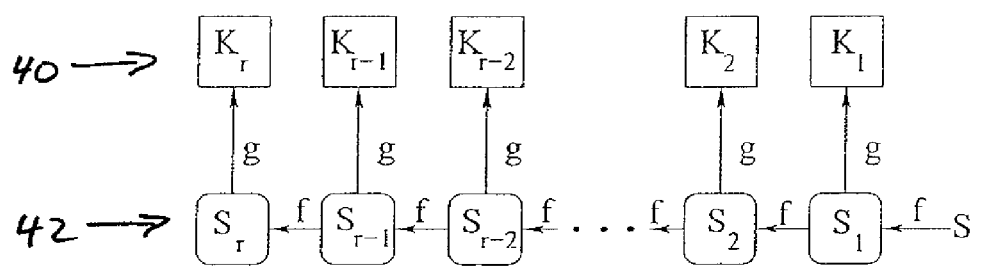
FIG. 3 is a simplified diagram of a seed chain and a corresponding key chain.

Referring also to FIG. 3, the GM 22 is further configured use one-way functions in calculations. The GM 22 stores two different one-way functions, f and g (i.e., functions whose operands cannot be derived given the results of using the operands in the functions). These functions f and g may not be perfectly one way, in that an operand may be derivable from a result of either function, but doing so is so computationally intense as to allow the functions f and g to be considered to be one-way functions. The functions f and g are configured such that it is computationally infeasible to derive the operand from the result; The time needed to compute the operand from the result is longer than the lifetime of the result. For example, and not by way of limitation, under current computer technology, it could take 100 years or more to determine an operand from a result of either function for g.

Referring also to FIG. 3, the GM 22 is configured to use the functions f and g to calculate key chains 40 for each of the members 26. The GM 22 is configured to apply the function f to the primary seed S (i.e., use the primary seed S as an operand in the function f) that the GM 22 downloads to the member 26 (each member 26 receives a primary seed, thus this discussion refers to only one of the members 26). The GM 22 applies the function f to the primary seed to obtain a first seed S. The GM 22 applies the function f to the resulting seed $S_1$ to obtain a second seed $S_2$, and continues applying the function f to the resulting seed until r seeds in addition to the primary seed S have been obtained. This produces a key chain 42 according to $S_i = f(S_{i-1})$, where the primary seed S is $S_0$, and the function is applied r times. Using each seed $S_x$ in the seed chain obtained by applying the function f, the GM 22 applies the function g to obtain a corresponding key $K_x$. Thus, the GM 22 determines the key chain 42 including keys $K_1, K_2, \ldots K_{r-1}, K_r$, for each of the members 26 according to $K_i = g(S_i)$. The seeds $S_x$ are related to the corresponding keys $K_x$ by the inverse of the function g, and are thus computationally difficult to determine from the key $K_x$. Similarly, prior seeds $S_{x-1}$ are related to later seeds $S_x$ by the inverse of the one-way function f and thus the prior seeds $S_{x-1}$ are computationally difficult to determine from the later seeds $S_x$. The keys are sequential in order from most senior key $K_1$ to most junior key $K_r$ corresponding to most senior seed $S_1$ to most junior seed $S_r$ (as seeds are produced in order from $S_1$ to $S_r$).

Further, the GM 22 is configured to store the key chains corresponding to the members 26, to track the current key for each of the members 26, and to provide the appropriate key to the appropriate SGM 24. The GM 22 is configured to store the key chains in a memory of the GM 22 in association with the corresponding members 26. At least each time an SGM 24 is changed, the GM 22 (that detects the SGM change) changes the current keys for all the members 26 whose SGM 24 changed. The current key can be tracked using a counter, e.g., decrementing the counter at each change and accessing a storage location indicated by the counter that stores the next key. Preferably, the GM 22 changes the current key K to the next key K in each member's key chain. The GM 22 preferably uses the keys in reverse order, such that the key $K_r$ is used first by being downloaded to the appropriate SGM 24 first, followed by the key $K_{r-1}$ and so on. The GM 22 is configured to download the appropriate key K to the appropriate SGM 24 with indicia associating the provided key K to the corresponding member 26.

The SGMs 24 are configured to receive and use the keys K from the GM 22 corresponding to the SGMs' associated members 26. The SGMs 24 are configured to use the received keys K to securely communicate in a secure, symmetric manner with the members 26 associated with the SGMs 24. Using the symmetric operation secure communications, the SGMs 24 can transmit data encryption keys, and data encrypted with the data encryption keys, to the members 26. The SGMs 24 are computer systems that are typically, although not mandated, lower-powered (in a processing capacity sense) than the GM 22, and higher-powered than the members 26 with which it is associated.

The SGMs 24 preferably do not receive the seeds.

The SGMs 24 may be transient, being capable of leaving or ceasing to be an SGM 24, and of replacing other SGMs 24. As such, the SGMs 24 are configured to establish communications with members 26 previously associated with an SGMs 24 that the replacing SGMs 24 replace. The SGMs 24 may also discontinue communications with members 26 when the SGMs leave the system 20 or cease being an SGM 24. SGMs 24 may expire, e.g., by existing for a predetermined amount of time.

A physical entity that is an SGM 24 may also be a member 26, with the SGM 24 and the member 26 functionality being separate. For example, a high-powered computer in a housing complex may be both SGM 24 and member 26, but the operation of the SGM 24 and the member 26 will be separate, and will operate as though the SGM 24 and the member 26 were physically different entities.

Each member 26 is configured to establish the temporary secure channels 32 with the GM 22, and to communicate with the GM 22 to establish its key chain. The members 26 are typically computer systems such as personal computers, mobile devices, cell phones, or pagers, although other configurations of the members 26 are acceptable. Using techniques similar to those discussed for establishing the channels 28, the members 26 can establish the channels 32. The members 26 can use the secure channels 32 to receive a primary seed S from the GM 22. Each member 26 is further configured to communicate with the GM 22 to agree upon the number of keys, r, that can be extracted or otherwise determined using the provided primary seed S.

Further, each of the members 26 is configured to store its key chain, to track the current key K, and to use the keys K to communicate with the corresponding SGM 24. Each member 26 is configured to store the key chains in a memory of the member 26. At least each time that the SGM 24 associated with the member 26 changes, the member 26 (that detects the change) changes the current key K, preferably to the next key K in the member's stored key chain. The current key can be tracked using a counter, e.g., decrementing the counter at each change and accessing a storage location indicated by the counter that stores the next key. The member 26 preferably uses the keys in reverse order, such that the key $K_r$ is used first, followed by the key $K_{r-1}$ and so on, and such that the GM 22 and the member 26 will have the same current key (i.e., be synchronized with respect to the keys K). Each member 26 uses the calculated keys K to securely communicate in a symmetric manner with its associated SGM 24. Using the symmetric operation secure communications, the members 26 can receive data encryption keys, and data encrypted with the data encryption keys, and can decrypt the data using the data encryption keys.

The members 26 can also use the key chain 40, or a key K from the chain 40, for authentication purposes. The member 26 can calculate a derivative from the key chain 40 to serve as an authentication key (e.g., a data authentication key). The derivative may be determined similarly to how a key is derived from a seed. Also, the member 26 can use the fact that the SGM 24 provides an expected key from the chain 40 as an implicit authentication under the assumption that the GM 22 would not provide the key K to an unauthorized/unauthenticated SGM 24. The members 26 can, e.g., compare a provided key with an expected key to verify authenticity.

Figure 4:
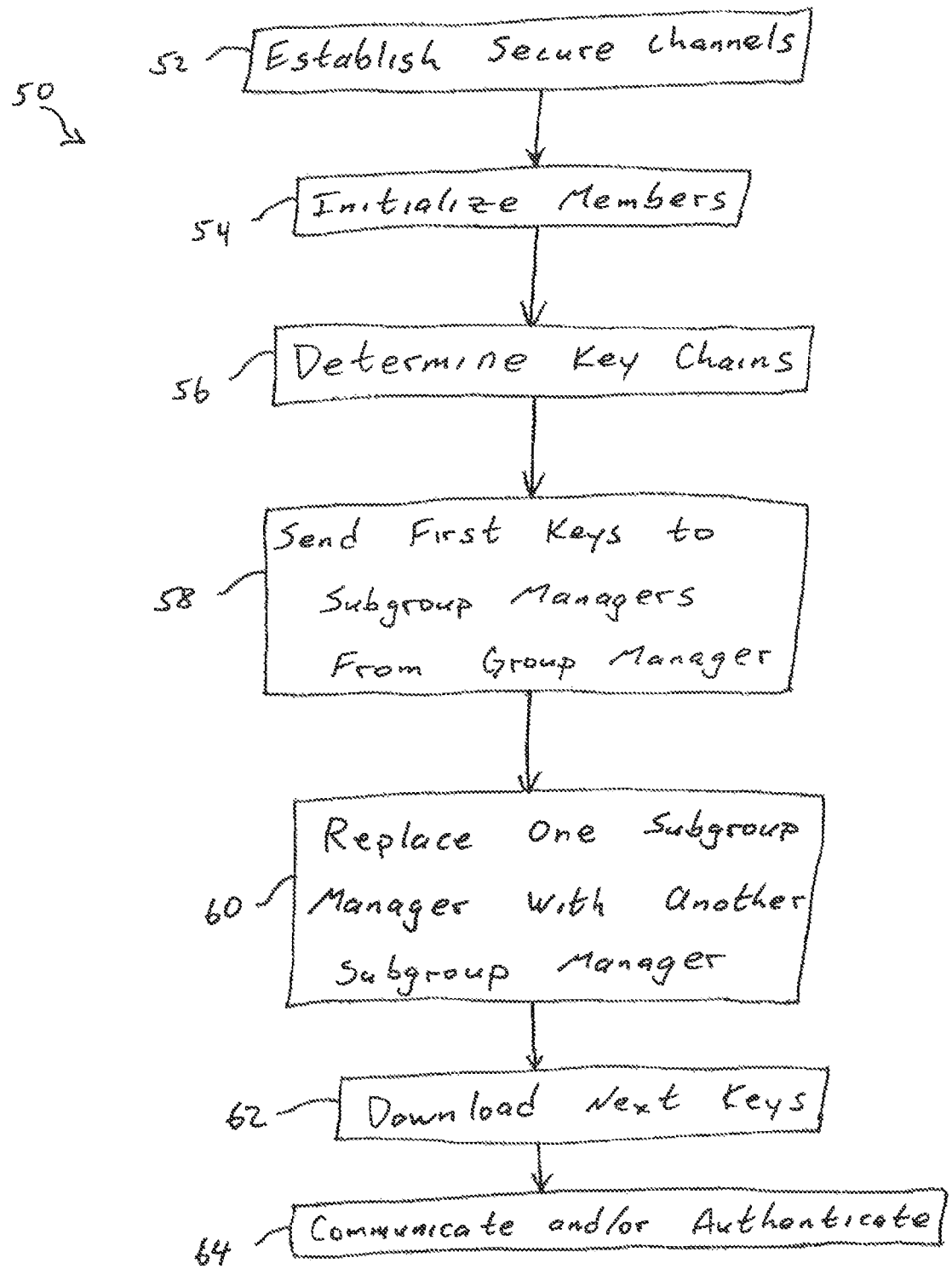
FIG. 4 is a block flow diagram of a process of using the system shown in FIG. 2.
Figure 5:
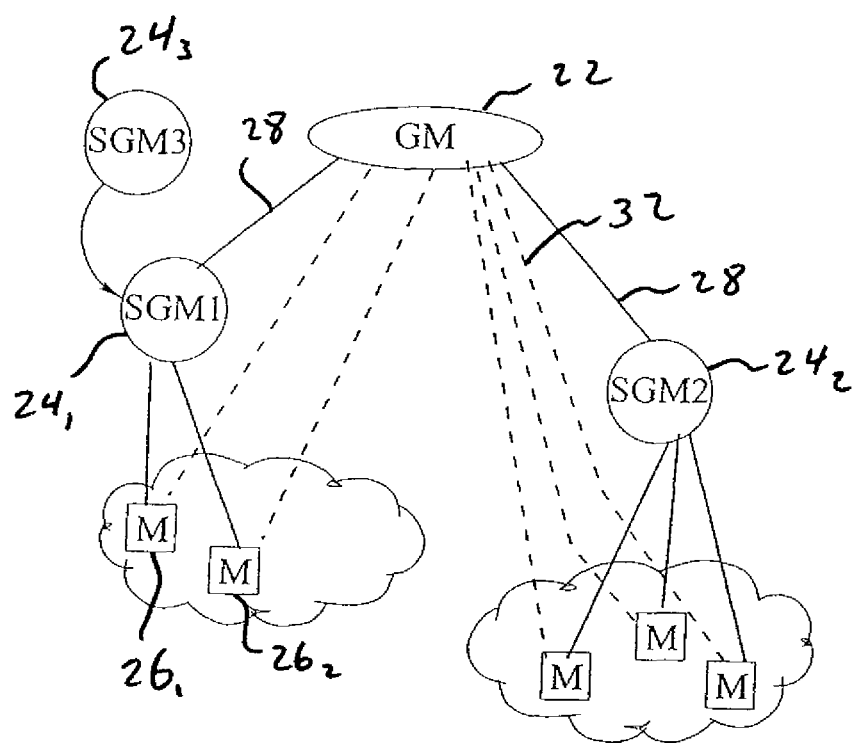
FIG. 5 is a simplified diagram of an exemplary group communications system employing seeded key chains illustrating a subgroup manager being replaced.

In operation, referring to FIGS. 4-5, with further reference to FIGS. 2-3, a process 50 for synchronizing encryption keys between the GM 22 and the members 26 of the system 20 includes the stages shown. The process 50, however, is exemplary only and not limiting. The process 20 can be altered, e.g., by having stages added, removed, or rearranged.

At stage 52, the GM 22 establishes secure channels 28, 32 with the SGMs 24 and the members 26, respectively. The secure channels 28 are established, e.g., using asymmetric key operations to agree upon a shared key for symmetric operations. The secure channels 32 between the GM 22 and the members 26 may be asymmetric operations.

At stage 54, the members 26 are initialized and then the channels 32 are torn down. The GM 22 and the members 26 communicate over the secure channels 32, with the GM 22 providing primary seeds S to the members 26 and the GM 22 and the members 26 agreeing upon the respective numbers r of seeds to be produced in their respective seed chains 42. Each channel 32 is torn down once the primary seed S is downloaded and the number r of seeds to be produced is agreed upon.

At stage 56, the keys K for each member 26 are determined by the GM 22 and the members 26. The GM 22 and the members 26 apply the function f to the primary and subsequent seeds to produce the seed chains 42, and apply the function g to the resulting seeds in the seed chain 42 to obtain the keys in the key chains 40. The GM 22 stores the key chains in memory in association with the corresponding members 26 such that the GM 22 can access a key for a selected member 26. The members 26 also store their key chains 42 for later retrieval, e.g., in numbered storage locations that can be identified by a counter.

At stage 58, the GM 22 sends the first keys $K_r$ for the respective members 26 to the SGMs 24, e.g., in FIG. 5 the keys for members $26_1$, $26_2$ to the SGMs $24_1$, $24_2$. The GM 22 can send encrypted data to the SGMs 24 and the SGMs 24 can send encrypted data (e.g., in the same format as received, or translated to another format) to the members 26. Communications between the SGMs 24 and the members 26 are secure using symmetric operations using the keys downloaded by the GM 22 and the same keys calculated by the members 26. The secure communications may be, e.g., to convey a data encryption key used by the GM 22 if the SGMs 24 relay encrypted data from the GM 22 without translation, or to convey SGM data encryption keys if the SGMs 24 do translate the data received from the GM 22.

At stage 60, the SGM $24_3$ replaces the SGM $24_1$, and the GM 22 and the members $26_1$, $26_2$ detect the change in SGMs 24. This detection can take a variety of forms and may be after the change, e.g., by receiving an indication from the new SGM $24_3$, or before the change, e.g., by recognizing or issuing a command from the GM 22 to replace the SGM $24_1$ with the SGM $24_3$.

At stage 62, in response to detecting the change, the GM 22 downloads the next keys, in the key chains 40 for the members $26_1$, $26_2$ associated with the new SGM $24_3$, to the new SGM $24_3$. The members $26_1$, $26_2$ associated with the new SGM $24_3$ access their memories and retrieve the next keys in their respective key chains 40.

At stage 64, the new SGM $24_3$ and its corresponding members $26_1$, $26_2$ communicate, and/or the members $26_1$, $26_2$ authenticate the SGM $24_3$. Secure communications are performed in a secure manner using symmetric operations by using the synchronized downloaded and retrieved keys. These communications can be, e.g., data encrypted using the synchronized keys, or a data encryption key encrypted with the synchronized keys, etc. Authentication may be a comparison of the key provided by the SGM $24_3$ and the key selected next by the members $26_1$, $26_2$.

Exemplary System

For example, as an illustration and not by way of limitation, the GM 22 could be a stock-quote server for providing streaming stock quotes, the SGMs 24 could be relays, and the members 26 could be end users' machines such as personal computers, pagers, cell phones, or personal digital assistants (PDAs), for displaying stock quotes from the GM 22.

The SGMs 24 could be relays disposed in close proximity to the members 26, with the SGM $24_1$ being a high-powered computer for a company and the SGM $24_2$ being a high-powered computer residing in a housing complex. The members $26_1$-$26_2$ are company employees and the members $26_3$-$26_5$ are residents of the housing complex. The physical entities that are SGMs can themselves be members 26, with the SGMs 24 and the members 26 being logically distinct within the same physical entities, and operating accordingly as described herein.

In this example, the GM 22 would provide encrypted stock quotes and the SGMs 24 would distribute the quotes to the members 26. The SGM 24 could relay encrypted data from the GM 22 without translating the data, or could decrypt the data, re-encrypt it using a different data encryption key, and send the re-encrypted (translated) data to the members 26.

Other Embodiments

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, the GM 22 may download all the keys K in a member's key chain 40, e.g., if the member 26 does not have memory for storing the key chain 40 or storing the key chain 40 at the member 26 is undesirable. Also, for changes in SGM 24, the key used by the member 26 and sent to the SGM 24 newly associated with the particular member 26 could be a key anywhere earlier in the chain 40, but is preferably the next-most junior key (i.e., the key from the next-most-recently produced seed relative to the seed of the key used before the SGM change).

What is claimed is:

1. A method of providing secure communication in a system comprising a master device, at least one auxiliary device and at least one end device, the method comprising:
   establishing a secure communication path between the master device and the at least one end device;
   agreeing by the master device and the end device on information necessary to produce at least one key;
   generating the at least one key;
   providing the at least one key from the master device to the at least one auxiliary device;
   authenticating the at least one auxiliary device by the at least one end device using the at least one key; and
   establishing another secure communication path between the at least one auxiliary device and the at least one end device.

2. The method of claim 1, wherein the master device generates the at least one key.

3. The method of claim 1, comprising storing the at least one key at the at least one end device.

4. The method of claim 1, comprising storing the at least one key at the master device.

5. The method of claim 1, comprising tearing down the secure communication path between the master device and the at least one end device.

6. The method of claim 5, comprising tearing down the secure communication path between the master device and the at least one end device before establishing the other secure communication path between the at least one auxiliary device and the at least one end device.

7. The method of claim 1, wherein the at least one key comprises at least one respective key corresponding to each end device.

8. The method of claim 1, wherein the at least one respective key comprises a respective key chain corresponding to each end device, each key chain comprising a respective predetermined number of keys.

9. The method of claim 8, wherein the predetermined number of keys is agreed upon by the master device and the at least one end device.

10. The method of claim 8, wherein a key chain corresponding to a first end device has a first predetermined number of keys and a key chain corresponding to a second end device has a second predetermined number of keys, the second number being different from the first number.

11. The method of claim 8, wherein the each key of each key chain is related to at least one other key of that key chain by at least one one-way function.

12. The method of claim 8, wherein a first key in each key chain is generated from a primary seed by:
   applying a first one-way function to the primary seed to generate a first seed; and
   applying a second one-way function to the first seed to generate a the first key, the second one-way function being different from the first one-way function.

13. The method of claim 12, wherein further keys in each key chain are generated from a seed already generated by:
   applying the first one-way function to a seed already generated to generate a next seed;
   and applying the second one-way function to the next seed to generate a next key.

14. The method of claim 13, further comprising repeating applying the first one-way function to a seed already generated to generate a next seed and applying the second one-way function to the next seed to generate a next key until the predetermined number of keys are generated for each key chain.

15. The method of claim 8, wherein:
   each auxiliary device is associated with at least one end device; and
   providing the at least one key to the at least one auxiliary device comprises providing to each auxiliary device a key of a respective key chain corresponding to each end device associated with the auxiliary device.

16. The method of claim 15, comprising:
   detecting a change of association of an end device from a first auxiliary device to a second auxiliary device;
   providing a previous key in the key chain corresponding to the end device to the second auxiliary device; and
   authenticating the second auxiliary device by comparing the key provided to the second auxiliary device to a key in a key chain corresponding to the end device at the end device.

17. The method of claim 16, wherein detecting a change of association comprises receiving an indication of a changed association of the end device from the first auxiliary device to the second auxiliary device.

18. The method of claim 16, wherein detecting a change of association comprises issuing a command from the master device to change an association of an end device from the first auxiliary device to the second auxiliary device.

19. The method of claim 1, wherein:
   each auxiliary device is associated with at least one end device; and
   providing the at least one key to the at least one auxiliary device comprises providing to each auxiliary device a respective key corresponding to each end device associated with the auxiliary device.

20. The method of claim 1, comprising tracking at the master device each key provided to each auxiliary device and the association of each key with a respective end device.

21. The method of claim 1, comprising communication between the at least one auxiliary device and the at least one end device over the second secure communication path using keys in the key chain provided to the at least one auxiliary device and stored at the at least one end device.

* * * * *